(12) United States Patent
He et al.

(10) Patent No.: US 10,650,492 B2
(45) Date of Patent: May 12, 2020

(54) METHOD AND APPARATUS FOR GENERATING IMAGE

(71) Applicant: Baidu Online Network Technology (Beijing) Co., Ltd., Beijing (CN)

(72) Inventors: Tao He, Beijing (CN); Gang Zhang, Beijing (CN); Jingtuo Liu, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 169 days.

(21) Appl. No.: 16/052,429

(22) Filed: Aug. 1, 2018

(65) Prior Publication Data

US 2019/0080433 A1 Mar. 14, 2019

(30) Foreign Application Priority Data

Sep. 8, 2017 (CN) .......................... 2017 1 0806066

(51) Int. Cl.
| | |
|---|---|
| *G06T 3/40* | (2006.01) |
| *G06T 7/33* | (2017.01) |
| *G06T 5/50* | (2006.01) |
| *G06N 3/08* | (2006.01) |
| *G06T 11/00* | (2006.01) |

(52) U.S. Cl.
CPC ............ *G06T 3/4007* (2013.01); *G06N 3/084* (2013.01); *G06T 5/50* (2013.01); *G06T 7/344* (2017.01); *G06T 11/00* (2013.01); *G06T 2207/30201* (2013.01)

(58) Field of Classification Search
CPC ....... G06T 3/4007; G06T 11/00; G06T 7/344; G06T 5/50; G06T 2207/30201; G06N 3/084; G06N 7/005; G06N 20/10; G06N 3/0454; G06N 3/0472
USPC .......................................................... 382/300
See application file for complete search history.

(56) References Cited

U.S. PATENT DOCUMENTS

| 9,530,047 B1 | 12/2016 | Tang et al. | |
|---|---|---|---|
| 2014/0379619 A1* | 12/2014 | Permeh | G06N 5/02 706/12 |
| 2017/0046553 A1* | 2/2017 | Homer | G06K 9/00006 |

FOREIGN PATENT DOCUMENTS

| CN | 105847968 A | 8/2016 |
|---|---|---|
| CN | 106600538 A | 4/2017 |
| CN | 106683048 A | 5/2017 |
| CN | 106952239 A | 7/2017 |
| CN | 106981047 A | 7/2017 |

\* cited by examiner

*Primary Examiner* — Amandeep Saini
(74) *Attorney, Agent, or Firm* — Seed IP Law Group LLP

(57) ABSTRACT

A method and an apparatus for generating an image are provided. A specific embodiment of the method comprises: acquiring a to-be-processed facial image, the image resolution of the to-be-processed facial image being lower than a preset first resolution threshold; and inputting the to-be-processed facial image into a pre-trained generative model to generate a processed facial image. The generative model updates a model parameter using a loss function in a training process, and the loss function is determined based on a probability of an image group being positive sample data, the image group composed of a facial sample image and a facial generative image. According to this embodiment, authenticity of the generated facial image is enhanced.

13 Claims, 3 Drawing Sheets

METHOD AND APPARATUS FOR GENERATING IMAGE

CROSS-REFERENCE TO RELATED APPLICATION

This application claims priority to Chinese Patent Application No. 201710806066.3, filed on Sep. 8, 2017, titled "Method and Apparatus for Generating Image," which is hereby incorporated by reference in its entirety.

TECHNICAL FIELD

The present disclosure relates to the field of computer technology, specifically to the image processing field, and more specifically to a method and apparatus for generating an image.

BACKGROUND

As high-definition display devices rapidly develop, demands on high-resolution images and videos are increasing. At the present stage, a low-resolution image may be converted into a high-resolution image by various methods, for example, a differential-based method, a reconstruction-based method, and a learning-based method. However, when a series of operations are performed on an image to convert the image from a low-resolution image to a high-resolution image, image distortion is often caused, so that the image is unable to meet actual requirements. For example, after a low-resolution facial image is converted into a high-resolution facial image through a series of operations, the face is distorted and cannot be correctly recognized. Therefore, when the low-resolution image is converted into the high-resolution image, how to avoid the image distortion as much as possible and ensure the authenticity of the image is an urgent problem to be solved.

SUMMARY

The objective of the present disclosure is to provide an improved method and apparatus for generating an image to solve the technical problems mentioned in the foregoing background section.

In a first aspect, the embodiments of the present disclosure provide a method for generating an image. The method comprises: acquiring a to-be-processed facial image, the image resolution of the to-be-processed facial image being lower than a preset first resolution threshold; and inputting the to-be-processed facial image into a pre-trained generative model to generate a processed facial image. The generative model is obtained through the following training steps: inputting a facial sample image into an initial generative model, and outputting, by the initial generative model, a facial generative image, the image resolution of the facial sample image being lower than the first resolution threshold; inputting a 2-tuple composed of a pixel matrix of the facial sample image and a pixel matrix of the facial generative image into a pre-trained discriminative model, and outputting, by the discriminative model, a probability of an image group being positive sample data, the image group composed of the facial sample image and the facial generative image, and the positive sample data including a first real facial image whose image resolution higher than a second resolution threshold and a second real facial image whose image resolution lower than the first resolution threshold which is generated based on the first real facial image; and obtaining a loss function of the initial generative model based on the probability, and updating a model parameter of the initial generative model using the loss function to obtain the generative model.

In some embodiments, the obtaining a loss function of the initial generative model based on the probability comprises: determining the loss function of the initial generative model based on the probability and a similarity between the facial generative image and a standard facial image. The standard facial image and a single facial generative image contain facial information of a same person.

In some embodiments, the determining the loss function of the initial generative model based on the probability and a similarity between the facial generative image and a standard facial image comprises: extracting respectively feature information of the facial generative image and feature information of the standard facial image using a pre-trained recognition model, and calculating a Euclidean distance between the feature information of the facial generative image and the feature information of the standard facial image; and obtaining the loss function of the initial generative model according to the probability and the Euclidean distance.

In some embodiments, the initial generative model is trained and obtained by: using a first facial sample image whose image resolution lower than the first resolution threshold as an input and using a second facial sample image whose image resolution higher than the second resolution threshold as an output by using a machine learning method. The first facial sample image and the second facial sample image contain the facial information of the same person.

In some embodiments, the discriminative model is trained and obtained by: using first sample data as an input and using annotation information of the first sample data as an output by using the machine learning method. The first sample data include positive sample data with annotation information and negative sample data with annotation information. The positive sample data include the first real facial image whose image resolution higher than the second resolution threshold and the second real facial image whose the image resolution lower than the first resolution threshold which is obtained based on the first real facial image, and the negative sample data include a third real facial image whose image resolution lower than the first resolution threshold and a facial image outputted based on the third real facial image by the generative model.

In some embodiments, the recognition model is trained and obtained by: using a third facial sample image as an input and feature information of the third facial sample image as an output by using the machine learning method.

In some embodiments, the generative model is a convolutional neural network model.

In a second aspect, the embodiments of the present disclosure provide an apparatus for generating an image. The apparatus comprises: an acquiring unit, configured to acquire a to-be-processed facial image, the image resolution of the to-be-processed facial image being lower than a preset first resolution threshold; a generating unit, configured to input the to-be-processed facial image into a pre-trained generative model to generate a processed facial image; and a generative model training unit, configured to train the generative model. The generative model training unit comprises: an outputting unit, configured to input a facial sample image into an initial generative model, and output, by the initial generative model, a facial generative image, the image resolution of the facial sample image being lower than the first resolution threshold; a probability generating unit, configured to input a 2-tuple composed of a pixel matrix of the facial sample image and a pixel matrix of the facial generative image into a pre-trained discriminative model, and output, by the discriminative model, a probability of an image group being positive sample data, the image group composed of the facial sample image and the facial generative image, and the positive sample data including a first real facial image whose image resolution higher than a second resolution threshold and a second real facial image whose image resolution lower than the first resolution threshold which is generated based on the first real facial image; and an updating unit, configured to obtain a loss function of the initial generative model based on the probability, and update a model parameter of the initial generative model using the loss function to obtain the generative model.

In some embodiments, the updating unit includes a determining unit. The determining unit is configured to: determine the loss function of the initial generative model based on the probability and a similarity between the facial generative image and a standard facial image. The standard facial image and a single facial generative image contain facial information of a same person.

In some embodiments, the determining unit is further configured to: extract respectively feature information of the facial generative image and feature information of the standard facial image using a pre-trained recognition model, and calculate a Euclidean distance between the feature information of the facial generative image and the feature information of the standard facial image; and obtain the loss function of the initial generative model according to the probability and the Euclidean distance.

In some embodiments, the apparatus further comprises an initial generative model training unit. The initial generative model training unit is configured to: use a first facial sample image whose image resolution lower than the first resolution threshold as an input and use a second facial sample image whose image resolution higher than the second resolution threshold as an output by using a machine learning method to train and obtain the initial generative model. The first facial sample image and the second facial sample image contain the facial information of the same person.

In some embodiments, the apparatus further comprises a discriminative model training unit. The discriminative model training unit is configured to: use first sample data as an input and use annotation information of the first sample data as an output by using the machine learning method to train and obtain the discriminative model. The first sample data include positive sample data with annotation information and negative sample data with annotation information. The positive sample data include the first real facial image whose image resolution higher than the second resolution threshold and the second real facial image whose image resolution lower than the first resolution threshold which is obtained based on the first real facial image, and the negative sample data include a third real facial image whose image resolution lower than the first resolution threshold and a facial image outputted based on the third real facial image by the generative model.

In some embodiments, the apparatus further comprises a recognition model training unit. The recognition model training unit is configured to: use a third facial sample image as an input and feature information of the third facial sample image as an output by using the machine learning method to train and obtain the recognition model.

In some embodiments, the generative model is a convolutional neural network model.

In a third aspect, the embodiments of the present disclosure provide a terminal. The terminal comprises: one or more processors; and a storage device, configured to store one or more programs. The one or more programs, when executed by the one or more processors, cause the one or more processors to implement the method as described in any embodiment in the first aspect.

In a fourth aspect, the embodiments of the present disclosure provide a computer readable storage medium storing a computer program. The computer program, when executed by a processor, implements the method as described in any embodiment in the first aspect.

According to the method and apparatus for generating an image provided by the embodiments of the present disclosure, the processed facial image is generated using the to-be-processed facial image whose resolution lower than the first resolution threshold based on the pre-trained generative model, which increase the resolution of the to-be-processed facial image. The generative model updates the model parameter using the loss function in the training process, and the loss function is determined based on the probability of the image group being the positive sample data, the image group composed of the facial sample image and the facial generative image. Therefore, authenticity of the facial image generated by the generative model may be enhanced.

BRIEF DESCRIPTION OF THE DRAWINGS

After reading detailed descriptions of non-limiting embodiments given with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
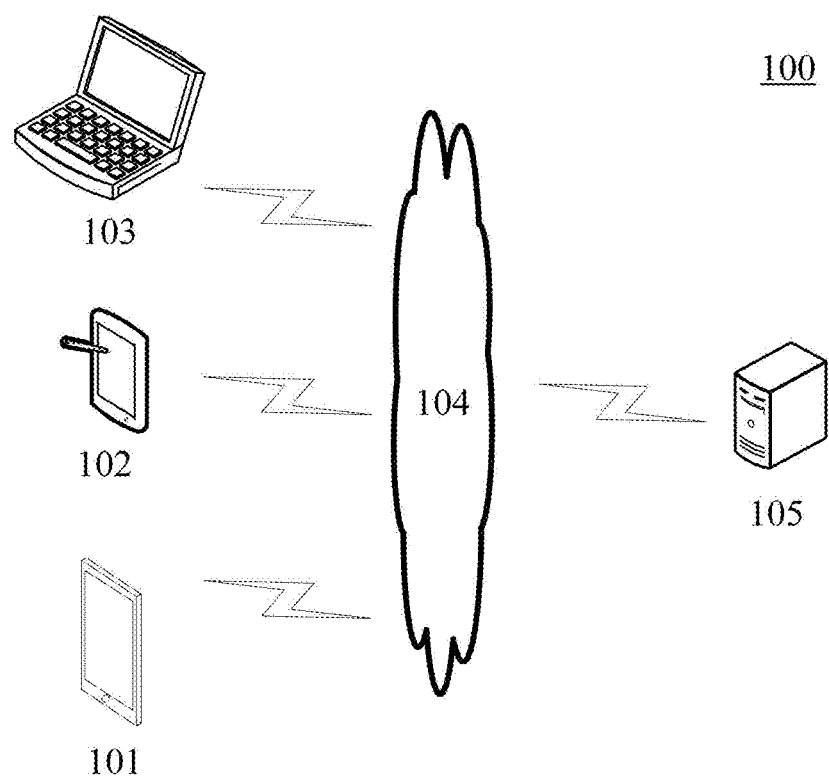
FIG. 1 is an exemplary system architecture diagram applicable to the present disclosure.

FIG. 1 shows an exemplary system architecture 100 which may be used by an image generating method or an image generating apparatus according to the present disclosure.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, such as wired or wireless transmission links, or optical fibers.

The user may use the terminal devices 101, 102 and 103 to interact with the server 105 through the network 104, in order to transmit or receive messages, etc. Various communication client applications, such as game applications, animation presenting applications, instant messaging tools, and social platform software may be installed on the terminal devices 101, 102 and 103.

The terminal devices 101, 102 and 103 may be various electronic devices having display screens and supporting image display, including but not limited to, smart phones, tablet computers, e-book readers, MP3 (Moving Picture Experts Group Audio Layer III) players, MP4 (Moving Picture Experts Group Audio Layer IV) players, laptop computers and desktop computers.

The server 105 may be a server providing various services, for example, a backend server supporting an image or a graph displayed by the terminal devices 101, 102 or 103. The backend server may return data (such as image data) to the terminal devices, for presentation on the terminal devices.

It should be noted that the image generation method according to the embodiments of the present disclosure may be executed by the terminal devices 101, 102 and 103, the server 105, or the combination thereof. Accordingly, an image generation apparatus may be disposed on the server 105, on the terminal devices 101, 102 and 103, or partially on the server 105 and partially on the terminal devices 101, 102 and 103. The disclosure is not limited in this regard.

It should be understood that the numbers of the terminal devices, the networks and the servers in FIG. 1 are merely illustrative. Any number of terminal devices, networks and servers may be provided based on the actual requirements.

Figure 2:
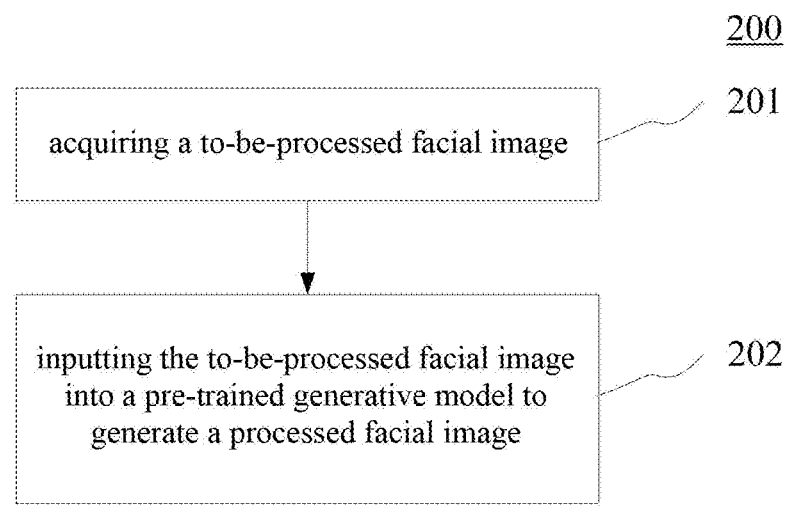
FIG. 2 is a flowchart of an embodiment of a method for generating an image according to the present disclosure.

Further referring to FIG. 2, which illustrates a flow 200 of an embodiment of a method for generating an image according to the present disclosure. The method for generating an image includes steps 201 and 202.

Step 201 includes acquiring a to-be-processed facial image.

In this embodiment, an electronic device (for example, the terminal devices 101, 102 and 103 or the server 105 as illustrated in FIG. 1) for performing the method for generating an image may locally or remotely acquire the to-be-processed facial image. The image resolution of the to-be-processed facial image is lower than a preset first resolution threshold. Here, the first resolution threshold may be manually set according to actual needs.

Step 202 includes inputting the to-be-processed facial image into a pre-trained generative model to generate a processed facial image.

In this embodiment, based on the to-be-processed facial image obtained in step 201, the electronic device may input the to-be-processed facial image into the pre-trained generative model to generate the processed facial image. The processed facial image is an image whose image resolution higher than a preset second resolution threshold. Here, the second resolution threshold may be manually set according to actual needs.

Here, the generative model may be trained by the electronic device or other electronic devices for training the generative model through the following steps. First, a facial sample image is inputted into an initial generative model, and a facial generative image is outputted by the initial generative model. The image resolution of the facial sample image is lower than the preset first resolution threshold. Here, the initial generative model may be a neural network model obtained through various approaches. For example, based on an existing neural network (e.g., a convolutional neural network), a neural network model is obtained by randomly generating network parameters of the neural network. Then, a 2-tuple composed of a pixel matrix of the facial sample image and a pixel matrix of the facial generative image is inputted into a pre-trained discriminative model, and a probability of an image group being positive sample data is outputted by the discriminative model. The image group composes of the facial sample image and the facial generative image. The positive sample data include a first real facial image whose image resolution higher than a second resolution threshold and a second real facial image whose image resolution lower than the first resolution threshold which is generated based on the first real facial image. Here, the second real facial image may be generated using the first real facial image in various ways, for example, an existing interpolation algorithm (e.g., a bilinear interpolation and a sinc interpolation). Finally, a loss function of the initial generative model is obtained based on the probability, and a model parameter of the initial generative model is updated using the loss function to obtain the generative model. For example, the loss function is propagated backward to the initial generative model to update the model parameter of the initial generative model. Here, assuming that the loss function of the generative model obtained based on the probability outputted by the discriminative model is $J^{(G)}$, $J^{(G)}$ may be represented in various forms, and one of the forms may be:

$$J^{(G)} = -\tfrac{1}{2} E_{x_1} \log(D(x_1)).$$

$x_1$ represents the 2-tuple composed of the pixel matrix of the facial sample image and the pixel matrix of the facial generative image. $D(x_1)$ represents the output of the discriminative model after $x_1$ is inputted into the discriminative model. $E_{x_1} \log(D(x_1))$ represents expectations of multiple $\log(D(x_1))$ when multiple $x_1$ are simultaneously trained. It should be noted that the training process of the generative model is merely used to explain the adjusting process for a parameter of the generative model. It may be considered that the initial generative model is a model whose parameter is not adjusted, and the generative model is a model whose parameter is adjusted. The adjusting process of the model parameter is not only limited to once, but may be repeated many times according to a degree of optimization of the model, actual needs, etc.

Common generative models may include, but not limited to, a deep neural network model, a Hidden Markov Model (HMM), a naive Bayesian model, a Gaussian mixture model, and the like. The above generative model may be a generative model contained in a generative adversarial network (GAN), and the generative adversarial network (GAN) is inspired from the two-player zero-sum game (two-player game) in the game theory. The generative model and the discriminative model are respectively served as the two game players in the GAN model. The generative model captures a distribution of sample data to generate a sample resembling real training data as much as possible. The discriminative model is a binary classifier to determine a probability of a sample coming from the real training data (rather than generated data of the generative model). Common discriminative models may include, but not limited to, a linear regression model, a linear discriminant analysis, a support vector machine (SVM), a neural network, etc. The generative model and the discriminative model may be simultaneously trained. When the discriminative model is fixed, the parameter of the generative model is adjusted. When the generative model is fixed, a parameter of the discriminative model is adjusted. In this embodiment, the generative model generates more and more realistic facial images through continuous learning; and the discriminative model enhances an ability to discriminate the generated facial image from the real facial image through continuous learning. Through the confrontation between the generative model and the discriminative model, finally, the facial image generated by the generative model is similar to the real facial image and thus successfully "cheats" the discriminative model. Such generative adversarial network may be used to increase the authenticity of the generative facial image.

In some alternative implementations of this embodiment, the obtaining a loss function of the initial generative model based on the probability may specifically include: determining the loss function of the initial generative model based on the probability and a similarity (e.g., a cosine similarity, a Jaccard similarity coefficient, and a Euclidean distance) between the facial generative image and a standard facial image. The standard facial image and a single facial generative image contain facial information of a same person. Here, the standard facial image may be a preset facial image, for example, it may be a pre-captured facial image meeting a demand, an identification photo, or the like.

In some alternative implementations, the determining the loss function of the initial generative model based on the probability and a similarity between the facial generative image and a standard facial image may specifically include the following steps. First, feature information of the facial generative image and feature information of the standard facial image may be respectively extracted using a pre-trained recognition model, and a Euclidean distance between the feature information of the facial generative image and the feature information of the standard facial image may be calculated. The standard facial image and the facial generative image contain the facial information of the same person. Then, the loss function of the initial generative model may be obtained according to the probability and the Euclidean distance. In an actual training process of a generative network model, in general, multiple pieces of sample data are simultaneously trained in one batch. Alternatively, assuming that the loss function of the generative model is $J^{(G)}$, $J^{(G)}$ may be represented in various forms, and one of the forms may be:

$$J^{(G)} = -\tfrac{1}{2} E_{x_1} \log(D(x_1)) + \|F(x) - F(x_0)\|_2.$$

$x_1$ represents the 2-tuple composed of the pixel matrix of the facial sample image and the pixel matrix of the facial generative image. ($D(x_1)$ represents the output of the discriminative model after $x_1$ is inputted into the discriminative model. $E_{x_1} \log(D(x_1))$ represents the expectations of multiple log $(D(x_1))$ when multiple $x_1$ are simultaneously trained. x represents the pixel matrix of the facial generative image. $F(x)$ represents the feature vector outputted from the recognition model after the facial generative image is inputted into the recognition model. $x_0$ represents the pixel matrix of the standard facial image. $F(x_0)$ represents the feature vector outputted from the recognition model after the standard facial image is inputted into the recognition model. $\|F(x)-F(x_0)\|_2$ represents the 2-norm of $F(x)$ and $F(x_0)$ used to represent the Euclidean distance between $F(x)$ and $F(x_0)$. The addition of the Euclidean distance between $F(x)$ and $F(x_0)$ to the loss function $J^{(G)}$ of the generative model is used to ensure that the Euclidean distance between the feature information of the facial image outputted by the generative model and the feature information of the standard facial image is as small as possible, thereby ensuring the similarity between the generated facial image and the standard facial image. That is, it is ensured that distortion of the generated facial image is as small as possible.

In some alternative implementations, the initial generative model may be trained through the following steps. The electronic device or other electronic devices for training the initial generative model may use a first facial sample image whose image resolution lower than the first resolution threshold as an input and use a second facial sample image whose image resolution higher than the second resolution threshold as an output by using a machine learning method (e.g., a neural network), to train and obtain the initial generative model. The first facial sample image and the second facial sample image contain the facial information of the same person. Here, the first facial sample image may be generated based on the second facial sample image in various ways, for example, the existing interpolation algorithm (e.g., the bilinear interpolation and the sinc interpolation).

In some alternative implementations of this embodiment, the discriminative model may be trained through the following steps. The electronic device or other electronic devices for training the discriminative model may use first sample data as an input and use annotation information of the first sample data as an output by using the machine learning method (e.g., the convolutional neural network) to train and obtain the discriminative model. The first sample data include positive sample data with annotation information and negative sample data with annotation information. The positive sample data include the first real facial image whose image resolution higher than the second resolution threshold and the second real facial image whose image resolution lower than the first resolution threshold which is obtained based on the first real facial image (e.g., obtained using the interpolation algorithm). The negative sample data include a third real facial image whose image resolution lower than the first resolution threshold and a facial image outputted based on the third real facial image by the generative model. For example, there is the first real facial image P1, the second real facial image P2 is obtained based on the first real facial image P1 using the interpolation method or the like, both the first real facial image P1 and the second real facial image P2 compose the positive sample data, and the annotation information may be set to 1. As another example, there is the third real facial image P3, and the facial image P4 is obtained by inputting the third real facial image P3 into the generative model, both the third real facial image P3 and the facial image P4 compose the negative image sample data, and the annotation information may be set to 0. For example, in the training process for the discriminative model, the positive image sample data may be annotated as 1, and the negative image sample data may be annotated as 0, to calculate a loss function of the discriminative model. The loss function of the discriminative model is propagated backward to the discriminative model for the discriminative model to update the model parameter according to the loss function, thus implementing the adjustment of the parameter of the discriminative model. Alternatively, the loss function of the discriminative model is $J^{(D)}$, where the calculation formula for $J^{(D)}$ may be:

$$J^{(D)} = -\tfrac{1}{2} E_{x_3} \log(D(x_3)) - \tfrac{1}{2} E_{x_4} \log(1 - D(x_4)).$$

$x_3$ represents the 2-tuple composed of the pixel matrix of the first real facial image whose image resolution higher than the second resolution threshold and the pixel matrix of the second real facial image whose image resolution lower than the first resolution threshold which is obtained based on the first real facial image. ($D(x_3)$) represents the output of the discriminative model after $x_3$ is inputted into the discriminative model. $E_{x_3} \log(D(x_3))$ represents the expectations of multiple $\log(D(x_3))$ when multiple $x_3$ are simultaneously trained. $x_4$ represents the 2-tuple composed of the pixel matrix of the third real facial image and the pixel matrix of the facial generative image outputted based on the third real facial image by the generative model. $D(x_4)$ represents the output of the discriminative model after $x_4$ is inputted into the discriminative model. $E_{x_4} \log(1-D(x_4))$ represents the expectations of multiple $\log(1-D(x_4))$, when multiple $x_4$ are simultaneously trained.

In some alternative implementations, the recognition model may be trained through the following steps. The electronic device or other electronic devices for training the recognition model may use a third facial sample image as an input and feature information of the third facial sample image as an output by using the machine learning method to train and obtain the recognition model. The feature information of the third facial sample image may refer to a feature vector representing a human face, such as a 512-dimensional feature vector representing the human face.

In some alternative implementations of this embodiment, the generative model may be a convolutional neural network model.

Figure 3:
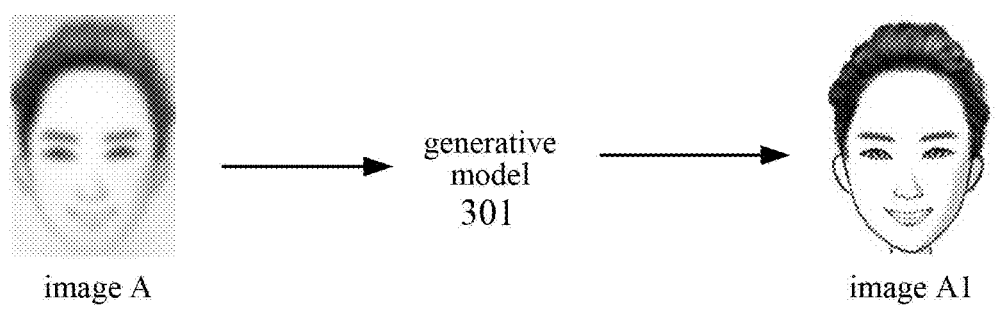
FIG. 3 is a schematic diagram of an application scenario of the method for generating an image according to the present disclosure.

Further referring to FIG. 3, which is a schematic diagram of an application scenario of the method for generating an image according to this embodiment. In the application scenario of FIG. 3, a terminal device (e.g., a mobile phone, and a computer) acquires a to-be-processed facial image A whose image resolution lower than the preset first resolution threshold. Then the terminal device inputs the acquired to-be-processed facial image A to a pre-trained generative model 301, and the generative model 301 generates a processed facial image A1. It should be noted that the images in FIG. 3 are merely used to schematically explain a process of generating a high-resolution facial image based on a to-be-processed low-resolution facial image, rather than limit contents of the input images or the like.

According to the method provided in the embodiment of the present disclosure, the generation of the processed facial image using the to-be-processed facial image whose image resolution lower than the first resolution threshold based on the pre-trained generative model increases the resolution of the processed facial image. In the training process, the generative model updates the model parameter using the loss function, and the loss function is determined based on the probability of the image group being the positive sample data, and the image group is composed based on the facial sample image and the facial generative image. Therefore, the authenticity of the facial image generated by the generative model may be enhanced.

Figure 4:
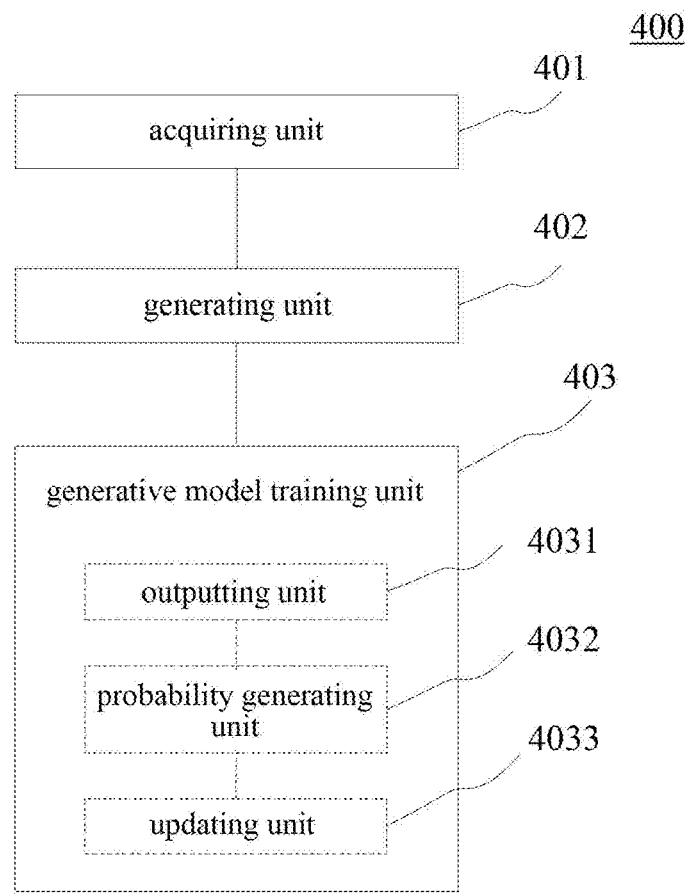
FIG. 4 is a schematic structural diagram of an embodiment of an apparatus for generating an image according to the present disclosure.

Further referring to FIG. 4, as an implementation of the method shown in the above-mentioned figures, the present disclosure provides an embodiment of an apparatus for generating an image. The embodiment of this apparatus corresponds to the embodiment of the method as illustrated in FIG. 2, and this apparatus may be applied in various electronic devices.

As shown in FIG. 4, the image generating apparatus 400 in this embodiment includes: an acquiring unit 401, a generating unit 402 and a generative model training unit 403. The acquiring unit 401 is configured to acquire a to-be-processed facial image. The image resolution of the to-be-processed facial image is lower than a preset first resolution threshold. The generating unit 402 is configured to input the to-be-processed facial image into a pre-trained generative model to generate a processed facial image. The generative model training unit 403 is configured to train the generative model. The generative model training unit 403 includes: an outputting unit 4031, configured to input a facial sample image into an initial generative model, and output, by the initial generative model, a facial generative image, the image resolution of the facial sample image being lower than the first resolution threshold; and a probability generating unit 4032, configured to input a 2-tuple composed of a pixel matrix of the facial sample image and a pixel matrix of the facial generative image into a pre-trained discriminative model, and output, by the discriminative model a probability of an image group being positive sample data, the image group being composed of the facial sample image and the facial generative image. The positive sample data include a first real facial image whose image resolution higher than a second resolution threshold and a second real facial image whose image resolution lower than the first resolution threshold which is generated based on the first real facial image. The generative model training unit 403 further includes an updating unit 4033, configured to obtain a loss function of the initial generative model based on the probability, and update a model parameter of the initial generative model using the loss function to obtain the generative model.

In this embodiment, specific processings of the acquiring unit 401, the generating unit 402, and the generative model training unit 403 of the image generating apparatus 400, and technical effects thereof may refer to relative descriptions of step 201 and step 202 in the corresponding embodiment of FIG. 2 respectively, which will not be repeatedly described here.

In some alternative implementations of this embodiment, the updating unit 4033 includes a determining unit (not shown). The determining unit is configured to determine the loss function of the initial generative model based on the probability and a similarity between the facial generative image and a standard facial image. The standard facial image and a single facial generative image contain facial information of a same person.

In some alternative implementations of this embodiment, the determining unit is further configured to: extract respectively feature information of the facial generative image and feature information of the standard facial image using a pre-trained recognition model, and calculate a Euclidean distance between the feature information of the facial generative image and the feature information of the standard facial image; and obtain the loss function of the initial generative model according to the probability and the Euclidean distance.

In some alternative implementations of this embodiment, the apparatus further includes an initial generative model training unit (not shown). The initial generative model training unit is configured to: use a first facial sample image whose image resolution lower than the first resolution threshold as an input and use a second facial sample image whose image resolution higher than the second resolution threshold as an output by using a machine learning method, to train and obtain the initial generative model. The first facial sample image and the second facial sample image contain the facial information of the same person.

In some alternative implementations of this embodiment, the apparatus further includes a discriminative model training unit (not shown). The discriminative model training unit is configured to: use first sample data as an input and use annotation information of the first sample data as an output by using the machine learning method to train and obtain the discriminative model. The first sample data include positive sample data with annotation information and negative sample data with annotation information. The positive sample data include the first real facial image whose image resolution higher than the second resolution threshold and the second real facial image whose image resolution lower than the first resolution threshold which is obtained based on the first real facial image. The negative sample data include a third real facial image whose image resolution lower than the first resolution threshold and a facial image outputted based on the third real facial image by the generative model.

In some alternative implementations of this embodiment, the apparatus further includes a recognition model training unit (not shown). The recognition model training unit is configured to: use a third facial sample image as an input and feature information of the third facial sample image as an output by using the machine learning method to train and obtain the recognition model.

In some alternative implementations of this embodiment, the generative model may be a convolutional neural network model.

Figure 5:
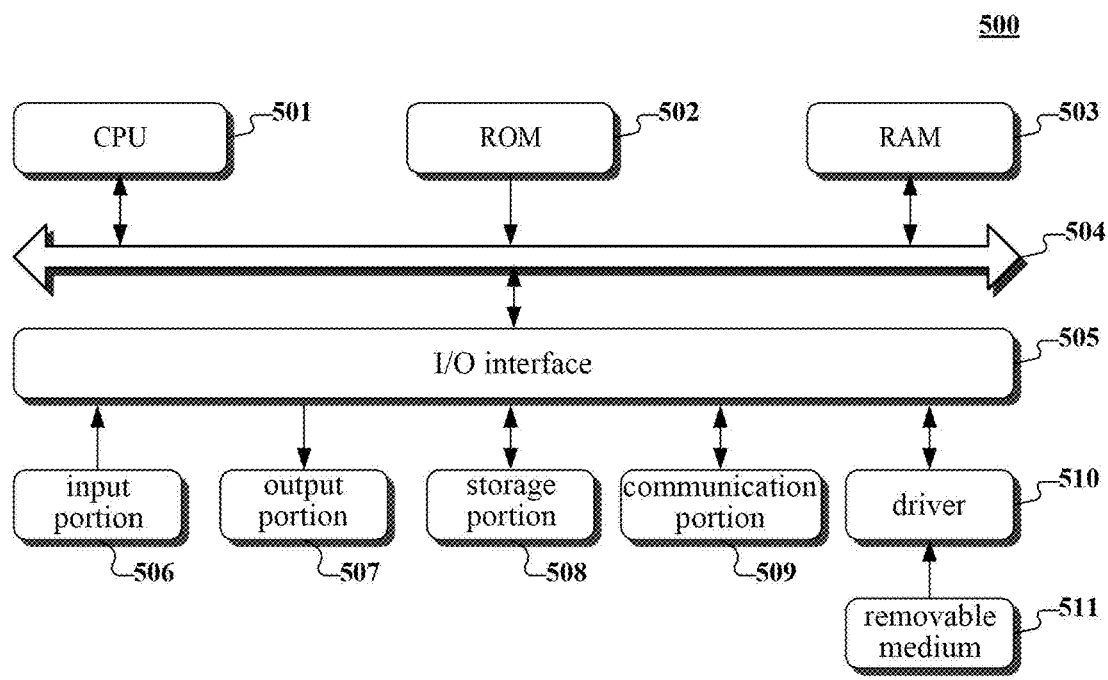
FIG. 5 is a schematic structural diagram of a computer system adapted to implement a terminal device according to embodiments of the present disclosure.

Referring to FIG. 5, a schematic structural diagram of a computer system 500 adapted to implement a terminal device of the embodiments of the present disclosure is shown. The terminal device shown in FIG. 5 is only an example, and is not a limitation to the function and scope of the embodiments of the disclosure.

As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a keyboard, a mouse etc.; an output portion 507 including a cathode ray tube (CRT), a liquid crystal display device (LCD), a speaker etc.; a storage portion 508 including a hard disk and the like; and a communication portion 509 including a network interface card, such as a LAN card and a modem. The communication portion 509 performs communication processes via a network, such as the Internet. A driver 510 is also connected to the I/O interface 505 as required. A removable medium 511, such as a magnetic disk, an optical disk, a magneto-optical disk, and a semiconductor memory, may be installed on the driver 510, to facilitate the installation of a computer program read from the removable medium 511 on the storage portion 508 as needed.

In particular, according to embodiments of the present disclosure, the process described above with reference to the flow chart may be implemented in a computer software program. For example, an embodiment of the present disclosure includes a computer program product, which comprises a computer program that is loaded in a computer-readable medium. The computer program comprises program codes for executing the method as illustrated in the flow chart. In such an embodiment, the computer program may be downloaded and installed from a network via the communication portion 509, and/or may be installed from the removable media 511. The computer program, when executed by the central processing unit (CPU) 501, implements the above mentioned functionalities as defined by the methods of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. In the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that maybe implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, described as: a processor, comprising an obtaining unit, a generating unit and a generative model unit, where the names of these units do not in some cases constitute a limitation to such units themselves. For example, the blocking unit may also be described as "a unit for processing to-be-process facial image."

In another aspect, the present disclosure further provides a computer-readable storage medium. The computer-readable storage medium may be the computer storage medium included in the apparatus in the above described embodiments, or a stand-alone computer-readable storage medium not assembled into the apparatus. The computer-readable storage medium stores one or more programs. The one or more programs, when executed by a device, cause the device to: acquire a to-be-processed facial image, the image resolution of the to-be-processed facial image being lower than a preset first resolution threshold; input the to-be-processed facial image into a pre-trained generative model to generate a processed facial image, where the generative model is obtained through the following training steps: inputting a facial sample image into an initial generative model, and outputting, by the initial generative model, a facial generative image, the image resolution of the facial sample image being lower than the first resolution threshold; inputting a 2-tuple composed of a pixel matrix of the facial sample image and a pixel matrix of the facial generative image into a pre-trained discriminative model, and outputting, by the discriminative model, a probability of an image group being positive sample data, the image group composed of the facial sample image and the facial generative image, and the positive sample data including a first real facial image whose image resolution higher than a second resolution threshold and a second real facial image whose image resolution lower than the first resolution threshold which is generated based on the first real facial image; and obtaining a loss function of the initial generative model based on the probability, and updating a model parameter of the initial generative model using the loss function to obtain the generative model.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for generating an image, comprising:
    acquiring a to-be-processed facial image, an image resolution of the to-be-processed facial image being lower than a preset first resolution threshold; and
    inputting the to-be-processed facial image into a pre-trained generative model to generate a processed facial image, wherein the generative model is obtained through the following training:
    inputting a facial sample image into an initial generative model, and outputting, by the initial generative model, a facial generative image, an image resolution of the facial sample image being lower than the first resolution threshold;
    inputting a 2-tuple composed of a pixel matrix of the facial sample image and a pixel matrix of the facial generative image into a pre-trained discriminative model, and outputting, by the discriminative model, a probability of an image group being positive sample data, the image group composed of the facial sample image and the facial generative image, and the positive sample data comprising a first real facial image whose image resolution higher than a second resolution threshold and a second real facial image whose image resolution lower than the first resolution threshold which is generated based on the first real facial image; and
    obtaining a loss function of the initial generative model based on the probability, and updating a model parameter of the initial generative model using the loss function to obtain the generative model.

2. The method according to claim 1, wherein the obtaining a loss function of the initial generative model based on the probability comprises:
    determining the loss function of the initial generative model based on the probability and a similarity between the facial generative image and a standard facial image, wherein the standard facial image and a single facial generative image contain facial information of a same person.

3. The method according to claim 2, wherein the determining the loss function of the initial generative model based on the probability and a similarity between the facial generative image and a standard facial image comprises:
    extracting respectively feature information of the facial generative image and feature information of the standard facial image using a pre-trained recognition model, and calculating a Euclidean distance between the feature information of the facial generative image and the feature information of the standard facial image; and
    obtaining the loss function of the initial generative model according to the probability and the Euclidean distance.

4. The method according to claim 1, wherein the initial generative model is trained and obtained by:
    using a first facial sample image whose image resolution lower than the first resolution threshold as an input and using a second facial sample image whose image resolution higher than the second resolution threshold as an output by using a machine learning method, wherein the first facial sample image and the second facial sample image contain the facial information of a same person.

5. The method according to claim 1, wherein the discriminative model is trained and obtained by:
    using first sample data as an input and using annotation information of the first sample data as an output by using a machine learning method, the first sample data comprising positive sample data with annotation information and negative sample data with annotation information, wherein the positive sample data comprises the first real facial image whose image resolution higher than the second resolution threshold and the second real facial image whose image resolution lower than the first resolution threshold which is obtained based on the first real facial image, and the negative sample data comprises a third real facial image whose image resolution lower than the first resolution threshold and a facial image outputted based on the third real facial image by the generative model.

6. The method according to claim 3, wherein the recognition model is trained and obtained by:
    using a third facial sample image as an input and feature information of the third facial sample image as an output by using a machine learning method.

7. An apparatus for generating an image, comprising:

at least one processor; and a memory storing instructions, the instructions when executed by the at least one processor, cause the at least one processor to perform operations, the operations comprising:

acquiring a to-be-processed facial image, an image resolution of the to-be-processed facial image being lower than a preset first resolution threshold;

inputting the to-be-processed facial image into a pre-trained generative model to generate a processed facial image; and training the generative model, wherein, the generative model is obtained through the following training:

inputting a facial sample image into an initial generative model, and output, by the initial generative model, a facial generative image, an image resolution of the facial sample image being lower than the first resolution threshold;

inputting a 2-tuple composed of a pixel matrix of the facial sample image and a pixel matrix of the facial generative image into a pre-trained discriminative model, and outputting, by the discriminative model, a probability of an image group being positive sample data, the image group composed of the facial sample image and the facial generative image, and the positive sample data comprising a first real facial image whose image resolution higher than a second resolution threshold and a second real facial image whose image resolution lower than the first resolution threshold which is generated based on the first real facial image; and obtaining a loss function of the initial generative model based on the probability, and updating a model parameter of the initial generative model using the loss function to obtain the generative model.

8. The apparatus according to claim 7, wherein the obtaining a loss function of the initial generative model based on the probability comprises:

determining the loss function of the initial generative model based on the probability and a similarity between the facial generative image and a standard facial image, wherein the standard facial image and a single facial generative image contain facial information of a same person.

9. The apparatus according to claim 8, wherein the determining the loss function of the initial generative model based on the probability and a similarity between the facial generative image and a standard facial image comprises:

extracting respectively feature information of the facial generative image and feature information of the standard facial image using a pre-trained recognition model, and calculating a Euclidean distance between the feature information of the facial generative image and the feature information of the standard facial image; and obtaining the loss function of the initial generative model according to the probability and the Euclidean distance.

10. The apparatus according to claim 7, wherein the initial generative model is trained and obtained by:

using a first facial sample image whose image resolution lower than the first resolution threshold as an input and using a second facial sample image whose image resolution higher than the second resolution threshold as an output by using a machine learning method to train and obtain the initial generative model, wherein the first facial sample image and the second facial sample image contain the facial information of a same person.

11. The apparatus according to claim 7, wherein the discriminative model is trained and obtained by:

using first sample data as an input and using annotation information of the first sample data as an output by using a machine learning method to train and obtain the discriminative model, the first sample data comprises positive sample data with annotation information and negative sample data with annotation information, wherein the positive sample data comprises the first real facial image whose image resolution higher than the second resolution threshold and the second real facial image whose image resolution lower than the first resolution threshold which is obtained based on the first real facial image, and the negative sample data comprises a third real facial image whose image resolution lower than the first resolution threshold and a facial image outputted based on the third real facial image by the generative model.

12. The apparatus according to claim 9, wherein the recognition model is trained and obtained by:

using a third facial sample image as an input and feature information of the third facial sample image as an output by using a machine learning method to train and obtain the recognition model.

13. A non-transitory computer storage medium, storing a computer program, wherein the computer program, when executed by a processor, cause the processor to perform operations, the operations comprising:

acquiring a to-be-processed facial image, an image resolution of the to-be-processed facial image being lower than a preset first resolution threshold; and inputting the to-be-processed facial image into a pre-trained generative model to generate a processed facial image, wherein the generative model is obtained through the following training:

inputting a facial sample image into an initial generative model, and outputting, by the initial generative model, a facial generative image, an image resolution of the facial sample image being lower than the first resolution threshold;

inputting a 2-tuple composed of a pixel matrix of the facial sample image and a pixel matrix of the facial generative image into a pre-trained discriminative model, and outputting, by the discriminative model, a probability of an image group being positive sample data, the image group composed of the facial sample image and the facial generative image, and the positive sample data comprising a first real facial image whose image resolution higher than a second resolution threshold and a second real facial image whose image resolution lower than the first resolution threshold which is generated based on the first real facial image; and obtaining a loss function of the initial generative model based on the probability, and updating a model parameter of the initial generative model using the loss function to obtain the generative model.

* * * * *